E. G. HANTZ.
BEVEL PROTRACTOR AND DEPTH GAGE FOR DIE MAKERS.
APPLICATION FILED DEC. 9, 1914.

1,141,391.

Patented June 1, 1915.

WITNESSES

INVENTOR
E. G. HANTZ

ATTORNEY

UNITED STATES PATENT OFFICE.

EMIL G. HANTZ, OF SOUTH CONNELLSVILLE, PENNSYLVANIA.

BEVEL-PROTRACTOR AND DEPTH-GAGE FOR DIE-MAKERS.

1,141,391. Specification of Letters Patent. Patented June 1, 1915.

Application filed December 9, 1914. Serial No. 876,224.

*To all whom it may concern:*

Be it known that I, EMIL G. HANTZ, a citizen of the United States of America, residing at South Connellsville, in the county of Fayette and State of Pennsylvania, have invented certain new and useful Improvements in Bevel-Protractors and Depth-Gages for Die-Makers, of which the following is a specification, reference being had therein to the accompanying drawing.

This invention relates to a bevel protractor and depth gage for die makers and has for its object to provide a device of such class, in a manner as hereinafter set forth, which is conveniently and quickly adjusted, capable of being set to any angle desired, embodying means for fixedly securing a scale member in a position to which it has been adjusted.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
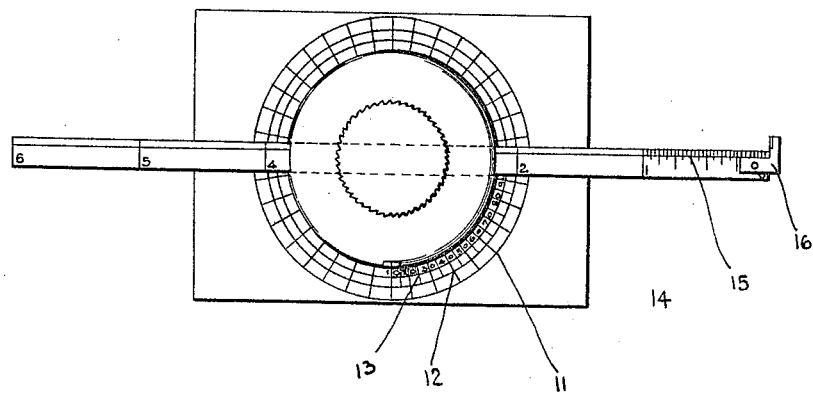
Figure 2:
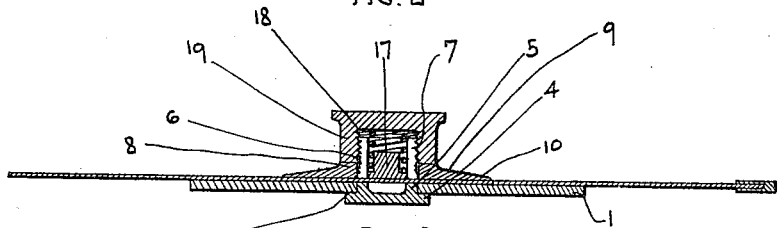
Figure 3:
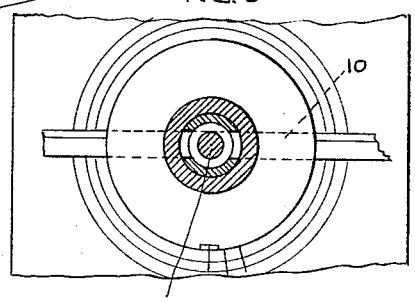

In the drawings wherein like reference characters denote corresponding parts throughout the several views:—Figure 1 is a top plan view of a gage in accordance with this invention. Fig. 2 is a cross sectional view. Fig. 3 is a sectional plan, broken away.

Referring to the drawings in detail 1 denotes a base plate having a centrally disposed opening 2, and extending up through said opening 2 is a plug comprising a head 4, and a hollow body portion 5, the latter being bifurcated at 6, 7, and also provided with peripheral threads 8.

Mounted upon the base 1 and through which projects the body portion 5 of a plug is an annular clamping member 9, the latter having an opening for the passage of the body portion 5 of the plug and further having its lower face formed with a transverse groove 10 which is of a length equal to the diameter of said clamping member and said groove 10 is rectangular in cross section.

The base 1 has its upper face formed with a series of concentric circles 11 divided by graduations 12 and associating with said graduations are scale indications 13.

Mounted upon the base 1 and of a length greater than the length of said base is a longitudinal shiftable and revoluble element 14 having a graduated scale 15 and the said element 14 in connection with the graduated scale 15 provides a scale member. One end of the element 14 has an angle-shaped element 16 connected thereto which constitutes a stop.

Seated upon the scale member is the head of a rivet 17 and supported by the head of the rivet, as well as surrounding the shank of the rivet, is a vertically disposed coil spring 18.

Engaging with the threads of the body portion 5 of the plug is an interiorly threaded clamping cap 19 which abuts against the spring 17 and the said cap 19 is employed for causing a clamping action between the member 9, base 1 and scale member to prevent the shifting of the latter after the scale member has been adjusted.

When the member 9 is not tightly clamped to the base 1, the scale member 14 can be revolved, the latter carrying the clamping member 9 therewith as well as the clamping cap 19.

What I claim is:—

1. A device for the purpose set forth comprising a base provided with graduations, a plug extending up through said base and including a head and hollow bifurcated body portion having peripheral threads, a longitudinal shiftable scale member mounted upon the base and extending through said bifurcated body portion, a grooved clamping member seated upon the base and overlapping said scale member and means engaging with the threads of the plug and said clamping member for setting up a clamping action between the clamping member, scale member and base to prevent shifting of the scale member.

2. A device for the purpose set forth comprising a base, a plug extending up therethrough and having peripheral threads, a longitudinal shiftable scale member mounted upon the base and extending through the plug, a clamping member mounted upon the base and overlapping said scale member, a spring controlled element bearing against said scale member and means engaging with the threads of the plug and with said element and clamping member for setting up a clamping action between the clamping member, scale member and base to prevent shifting of the scale member.

3. A device for the purpose set forth comprising a base, a plug extending up therethrough and having peripheral threads, a longitudinal shiftable scale member mounted upon the base and extending through the plug, a clamping member mounted upon the base and overlapping said scale member, a spring controlled element bearing against said scale member and means engaging with the threads of the plug and with said element and clamping member for setting up a clamping action between the clamping member, scale member and base to prevent shifting of the scale member, and said scale member capable of being revolved upon the base when said clamping action is relieved and during the revolving thereof carrying said plug, clamping member and means therewith.

4. A device for the purpose set forth comprising a base, a plug extending up therethrough and having peripheral threads, a longitudinal shiftable scale member mounted upon the base and extending through the plug, a clamping member mounted upon the base and overlapping said scale member, a spring controlled element bearing against said scale member and means engaging with the threads of the plug and with said element and clamping member for setting up a clamping action between the clamping member, scale member and base to prevent shifting of the scale member, said base having graduations associated with said scale member.

In testimony whereof I affix my signature in the presence of two witnesses.

EMIL G. HANTZ.

Witnesses:
ORRIN L. MARSH,
GEORGE W. HARTMAN.

Copies of this patent may be obtained for five cents each, by addressing the "Commissioner of Patents, Washington, D. C."